United States Patent [19]

Meyer et al.

[11] Patent Number: 5,439,028

[45] Date of Patent: Aug. 8, 1995

[54] MODULAR VALVE FOR A BUILDING STANDPIPE

[75] Inventors: George G. Meyer; Stephen J. Meyer, both of Malvern; William J. Reilly, Langhorne, all of Pa.

[73] Assignee: Central Sprinkler Corporation, Lansdale, Pa.

[21] Appl. No.: 176,158

[22] Filed: Dec. 30, 1993

Related U.S. Application Data

[62] Division of Ser. No. 955,617, Oct. 2, 1992, Pat. No. 5,295,503.

[51] Int. Cl.⁶ .................. F16K 37/00; F16K 15/18; A62C 35/58
[52] U.S. Cl. .................... 137/556; 137/552; 137/554; 137/557; 251/73; 251/83; 251/266; 251/276; 251/279; 251/289; 251/293; 169/19; 169/21
[58] Field of Search ............. 137/552, 553, 554, 556, 137/557; 251/73, 82, 83, 94, 266, 276, 278, 279, 289, 293; 169/19, 20, 21, 22

[56] References Cited

U.S. PATENT DOCUMENTS

| | | | |
|---|---|---|---|
| 11,988 | 5/1902 | Gray | 169/20 |
| 1,299,679 | 4/1919 | Chandler | 169/21 |
| 1,367,911 | 2/1921 | Kopin | 251/82 |
| 1,447,652 | 3/1923 | Farmer | 251/289 X |
| 1,947,309 | 2/1934 | Rowley | 251/73 |
| 2,398,461 | 4/1946 | Rider | 251/73 X |
| 2,900,029 | 8/1959 | Herkimer | 169/22 |
| 2,999,666 | 9/1961 | Sjogren | 251/82 |
| 3,023,744 | 3/1962 | Schuller | 137/553 |
| 3,187,499 | 6/1965 | Ault | 251/73 X |
| 3,190,611 | 6/1965 | Prescott et al. | 251/266 |
| 3,307,633 | 3/1967 | Newall | 169/22 |
| 3,334,858 | 8/1967 | Hay | 251/82 |
| 3,587,746 | 6/1971 | Venison et al. | 169/19 |
| 3,817,278 | 6/1974 | Elliott | 137/527 |
| 3,876,179 | 4/1975 | Baumann | 251/298 |
| 3,885,771 | 5/1975 | Baumann | 251/298 |
| 4,253,485 | 3/1981 | Legille | 137/315 |
| 4,353,390 | 10/1982 | Karpenko | 251/82 X |
| 4,469,122 | 9/1984 | Meek | 137/312 |
| 4,561,630 | 12/1985 | McCulloch | 251/73 X |
| 4,669,500 | 6/1987 | Strelow | 137/514 |
| 4,854,342 | 8/1989 | Polan | 137/516.29 |
| 4,921,003 | 5/1990 | Horvei | 137/315 |

OTHER PUBLICATIONS

Watts Regulator Co., "Watts No. 127W", date unknown.
Grinnell Fire Protection Systems Co., "Dry Pipe Valve", Apr. 1983.
Grinnell Fire Protection Systems Co., "Deluge Valves, Vertical 4 & 6 inch", Model A-4 Multimatic, Jul. 1983.
Central Sprinkler Co., "Alarm Check Valve", Aug. 1985.
Central Sprinkler Co., "Check Valve-90" Nov. 1987.
Grinnell Fire Protection Systems Co., "Wall Indicator Posts, Straight Type", Model F751, May 1987.
Central Sprinkler Co., "Shotgun-90" Feb. 1989.
Grinnell Fire Protection Systems Co., "Riser Check Valves", Grooved End 2 thru 6 inch, May 1990.
Central Sprinkler Co., "Dry Pipe Valve", Nov. 1990.
Central Sprinkler Co., "Deluge Valve Model A", Apr. 1991.

Primary Examiner—John Rivell
Attorney, Agent, or Firm—Panitch Schwarze Jacobs & Nadel

[57] ABSTRACT

A modular valve field convertible between a wet and dry configuration including a valve body and a passage within the valve body for allowing fluid to flow therethrough. A valve seat and clapper are positioned within the valve body. The clapper is allowed to pivot between a first position wherein the clapper is sealingly engaged with the valve seat and a second position wherein the clapper is spaced from the valve seat to allow fluid to flow through the valve. The operator controls the position of the clapper with respect to the valve seat. An operator securely retains the clapper in the first position in a first mode of operation and allows the clapper to freely move between the first and second positions in a second mode of operation. A controller governs the position of the clapper with respect to the valve seat when the operator is in the second mode of operation. The controller has a set position wherein the clapper is maintained in the first position and an activated position wherein the clapper is free to move between the first and second positions.

31 Claims, 6 Drawing Sheets

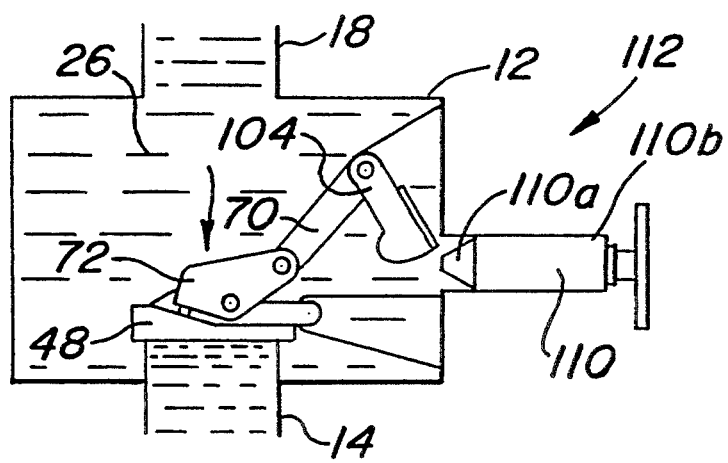
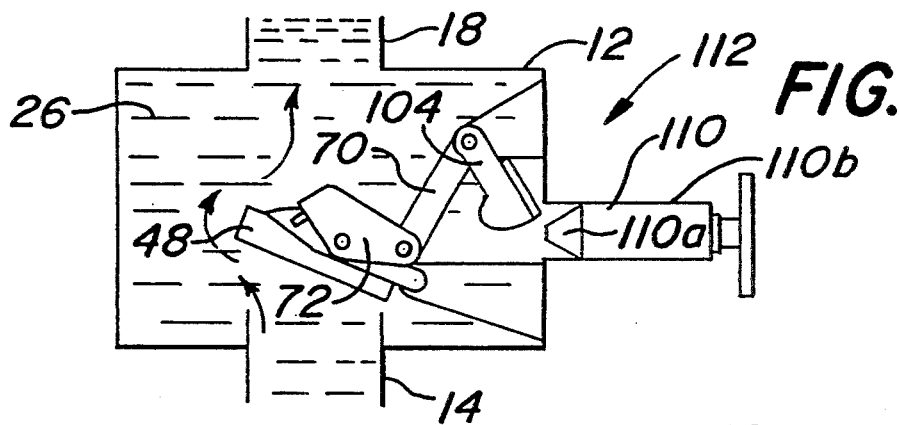
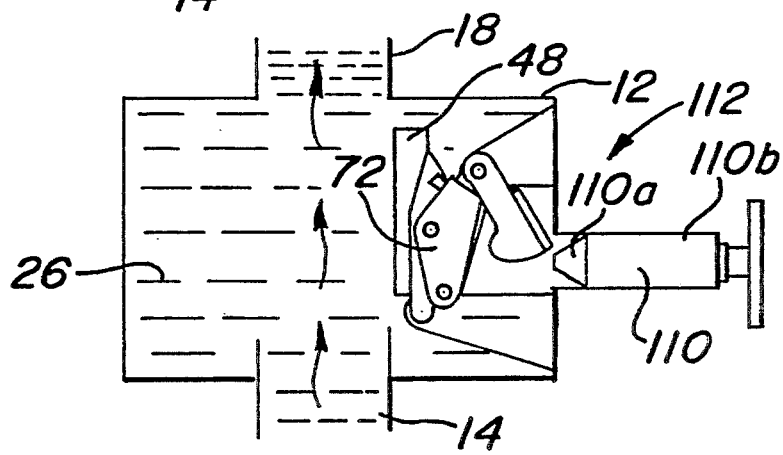
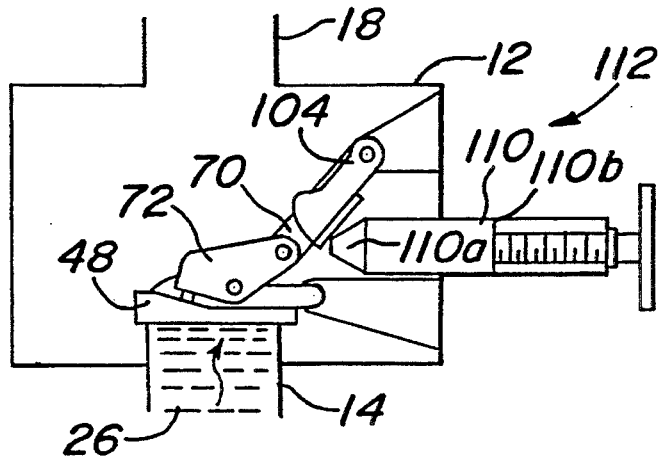

5,439,028

MODULAR VALVE FOR A BUILDING STANDPIPE

CROSS-REFERENCE TO RELATED APPLICATION

This application is a division of application Ser. No. 07/955,617, filed Oct. 2, 1992, now U.S. Pat. No. 5,295,503.

FIELD OF THE INVENTION

The present invention relates generally to fire protection equipment and, more particularly, to a system valve for a sprinkler system.

BACKGROUND OF THE INVENTION

Depending on the nature of the sprinkler system and the environment it is designed to protect, the system valve may be any of the following types: alarm valve ("wet" system), deluge valve ("wet", "dry" or "electric" systems), check valve ("wet" system), dry valve ("dry" system), dry differential valve ("dry" system) and control valve. Typically, the type of sprinkler system is selected during the design phase of the building which receives the sprinkler system. The type of sprinkler system selected dictates the type of system valve used.

While buildings typically remain useful for decades, it may become necessary to modify the sprinkler system in accordance with the evolving needs of the building. For instance, the building may initially be used as an office building. Such an office building typically includes a "dry" sprinkler system which employs a dry valve. After a significant period of years, the owner of the office building may decide to attract other clientele. For instance, the owner could convert the building to a facility for storing flammable products. In such an event, the original "dry" sprinkler system and dry valve would not provide adequate fire protection. Therefore, it would become necessary to convert the "dry" sprinkler system and dry valve to a "wet" sprinkler system and deluge valve for the purpose of insuring the safety of the building.

To convert the "dry" sprinkler system or a deluge valve and dry valve to a "wet" sprinkler system, it would be necessary to remove the dry or deluge valve from service and replace it with a wet valve. This process requires a significant period of time to accomplish, thereby increasing the overall cost of modifying the sprinkler system. Hence, a need has arisen for a modular system valve which can be readily field converted between an alarm valve, deluge valve, check valve, dry valve, dry differential valve and control valve.

As mentioned above, sprinkler systems often include a dry valve as the system valve. Some dry valves are problematic because the air pressure on the system side of the valve must be maintained at a relatively high level (e.g., 30-60 psi) in order to maintain the clapper in the closed position. Once the system is activated, the clapper is released from its closed position due to reduced air pressure within the system. Typically, the clapper is released before the residual air pressure within the system has decreased to the point where water can freely flow into the system (i.e., without being inhibited by the air pressure). Thus, the National Fire Protection Association (NFPA) requires such systems to include quick opening devices to assist in the exhausting of air so the water can freely flow into the system.

Even including such quick opening devices, the conventional dry valve-systems are generally slow acting to a fire condition. Hence, a need has arisen for a dry valve which is maintained in a set position by a relatively low air pressure within the system to enable the system to be more quickly filled with water upon actuation.

In addition, conventional deluge valves are problematic because they are slow to allow the lever to move from its latched position on the clapper. That is, such deluge valves typically include a diaphragm chamber which receives water or air pressure for causing a nose pin to engage and hold the lever in its latched position on the clapper. When the water or air pressure within the diaphragm chamber begins to decrease, the nose pin slowly moves away from the lever allowing the lever to slowly pivot away from the clapper. Hence, a need has arisen for providing an additional force to the nose pin to quickly move the nose pin from the set position to the activated position upon the activation of the system. Thus, there is a desire for a deluge valve which opens quickly in response to the activation of the system.

Conventional differential dry valves are cumbersome to reset after the system has been activated and the fire extinguished. That is, the entire sprinkler system must be shut down and the interior of the differential dry valve must be accessed to reset the valve. More particularly, once the differential dry valve is activated, the clapper pivots upwardly and is latched away from the valve seat to insure that it does not interfere with the flow of water therethrough. Once the fire has been extinguished, it is necessary to shut off the main supply of water, drain the water from the system and then access the interior of the differential dry valve to unlatch and reset the clapper. Accordingly, a need has arisen for a differential dry valve which can be reset without having to shut down the main supply of water and access the interior of the differential dry valve to reset the clapper.

None of the above-mentioned wet system valves include a flow switch within the valve body. Conventionally, flow switches are installed within the sprinkler system downstream from the system valve in one of the pipes. As such, it is necessary to purchase different size flow switches in accordance with the size of the pipe for which it is to be installed. Accordingly, a system valve which incorporates a flow switch within the body thereof, would enable one switch to fit all sprinkler systems and thereby reduce installation expense.

Some system valves may be controlled or accessed from the exterior of the building in which the valve is installed. Typically, such access is provided by the use of a wall indicator post. Wall indicator posts are typically designed to operate non-rising stem (inside screw) control valves, which are used to control the water supply to an automatic sprinkler, water spray deluge, foam-water deluge, or standpipe fire protection systems. Wall indicator posts permit operation of valves located immediately inside exterior walls while providing an exterior visual indication as to whether the valves are open or shut, in addition to a means for locking or sealing the valves in a particular position. Since wall indicator posts allow for valve operation from outside of the protected property, the opportunity for more prompt valve operation in an emergency situation is provided.

While conventional wall indicator posts are useful from outside the building, they are problematic in that they do not provide any ability to control the valve from within the building or to provide any interior visual indication as to whether the valve is open or shut. The ability to control the valve from within the building as well as to monitor the condition of the valve from within the building is particularly useful during an emergency situation. Hence, there exists a need for a valve and wall indicator post combination which would allow the valve to be controlled and monitored from both inside and outside of the building.

The most common type of check valve is a swing check valve consisting of a hinged clapper assembly mounted inside a pipe line. The clapper assembly generally includes a clapper and a clapper arm which suspends the clapper from the valve body. When there is no flow in the pipeline, the clapper of the assembly is maintained in a closed position. As fluid flows through the pipeline in the desired direction, the fluid pressure swings the clapper partially open. When fluid tries to flow in the undesired direction, the reverse fluid pressure presses the clapper shut, thereby stopping such flow.

In such conventional check valves, there is no intermediate position wherein the valve controls the degree of fluid flowing through the pipeline in the desired direction. To obtain a degree of control over the fluid flowing through the check valve, a control valve is installed in series with the check valve. Hence, to prevent back flow of fluid, it is necessary to use two valves. This increases costs since two valves must be purchased and installed. As such, there exists a need for a check valve which includes the further feature of being able to control the flow rate of the fluid flowing through the valve.

The present invention overcomes many of the disadvantages inherent in the above-described system valves by providing a modular valve which can be field converted between a wet configuration for a wet piping system and a dry configuration for a dry piping system. The dry differential valve of the present invention is of the low air pressure type which permits the sprinkler system to be quickly filled with water and opens relatively quickly. Moreover, the low air pressure dry valve of the present invention can be reset externally without disassembly, thereby saving time and effort. Further, the check valve of the present invention can function purely as a check valve or as a control valve to control the flow of water therethrough. In addition, the valve body of the present invention includes a flow switch thereby eliminating further installation expense of such a flow switch downstream from the valve. Consequently, use of the present invention results in a considerable savings in money by reducing the number of valves as well as time when converting the sprinkler system to a different system valve and in resetting the system valve. Use of the present invention allows the system to be reactivated relatively quickly and is, therefore, safer than existing systems.

SUMMARY OF THE INVENTION

Briefly stated, the present invention relates to a valve. The valve includes a valve body including an inlet for being in fluid communication with a fluid source and an outlet for being in fluid communication with an outlet conduit. A passage within the valve body interconnects the inlet and outlet for allowing fluid to flow through the valve body between the inlet and the outlet. A valve seat is positioned within the valve body in alignment with the passage for allowing fluid to flow therethrough. A clapper is positioned within the passage. A hinge means interconnected between the valve body and the clapper allows the clapper to pivot between a first position wherein the clapper is sealingly engaged with the valve seat to prevent fluid from flowing between the inlet and outlet and a second position wherein the clapper is spaced from the valve seat to allow fluid to flow from the inlet toward the outlet. An operator means controls the position of the clapper with respect to the valve seat. The operator means securely retains the clapper in the first position in a first mode of operation and allows the clapper to freely move between the first and second positions in a second mode of operation. When operating in the second mode, the clapper moves to the first position when fluid flows through the passage from the outlet toward the inlet and the clapper moves to the second position when fluid flows through the passage from the inlet toward the outlet.

The present invention also relates to a valve for a dry piping system which includes a latch positioned proximate the clapper. The latch is moveable between a locked position wherein the latch engages the clapper when the clapper is in the first position and an unlocked position wherein the latch is spaced from the clapper when the clapper is in the second position. An actuator member mounted on the valve body and extending into the passage engages the latch. The actuator member is movable between a set position wherein the latch is maintained in the locked position and an activated position wherein the actuator member is moveable to the unlocked position. A force applicator means applies a first force to the actuator member to move the actuator member from the activated position to the set position and to maintain the actuator member in the set position wherein the clapper and latch are in the first and locked positions, respectively. The force applicator means applies a second force to the actuator member to move the actuator member from the set position to the activated position and to maintain the actuator member in the activated position wherein the clapper and latch are in the second and unlocked positions, respectively.

BRIEF DESCRIPTION OF THE DRAWINGS

The foregoing summary, as well as the following detailed description of the preferred embodiment will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings:

FIG. 6 is a schematic elevational view of the valve shown in FIG. 1 in a deactivated position;

FIG. 7 is a schematic elevational view of the valve shown in FIG. 1 partially opened;

FIG. 8 is a schematic elevational view of the valve shown in FIG. 1 in the open position;

FIG. 9 is a schematic elevational view of the valve shown in FIG. 1 in a closed position;

DESCRIPTION OF THE PREFERRED EMBODIMENTS

Figure 1:
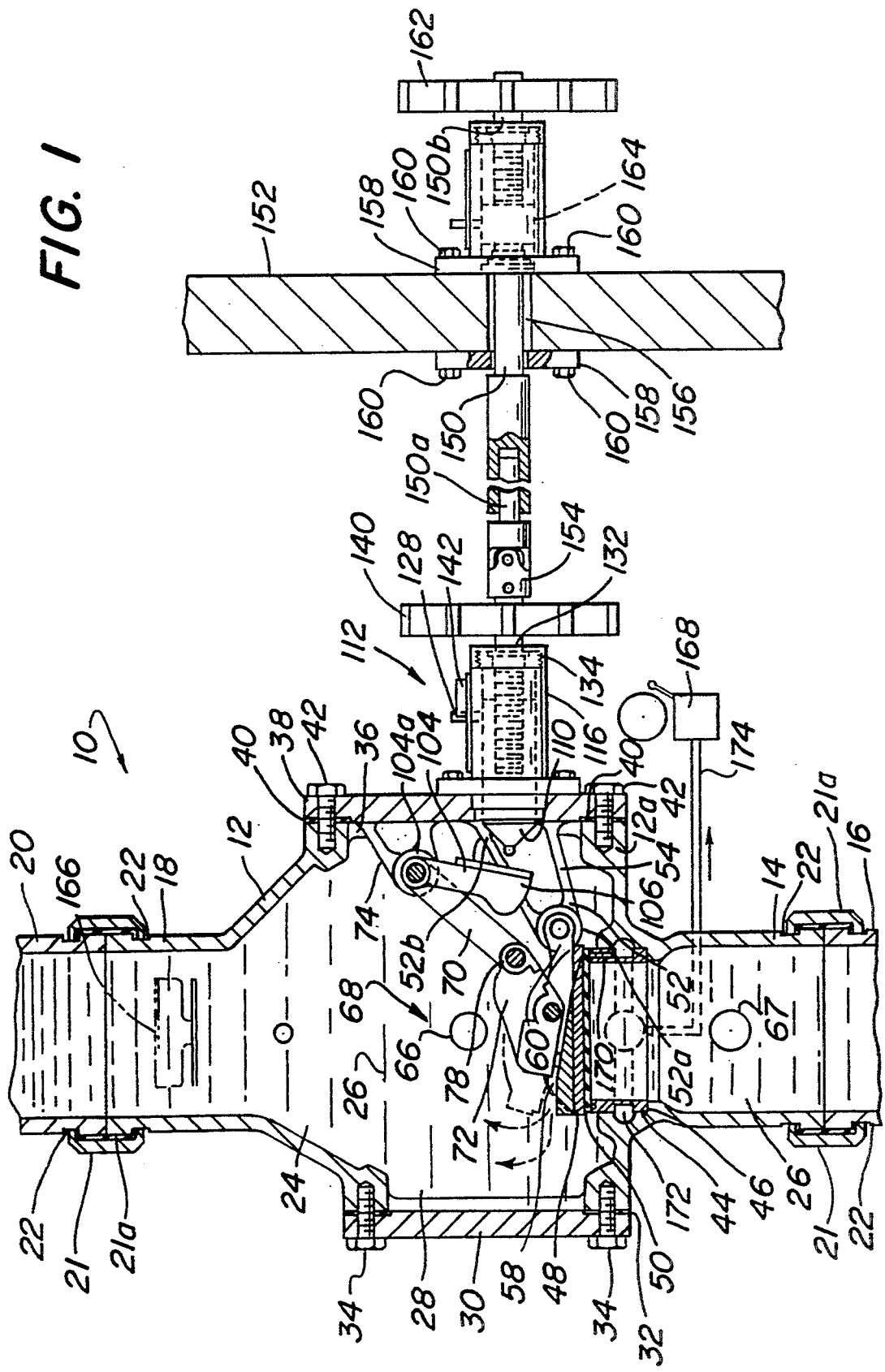
FIG. 1 is an elevational view, partially in cross section, showing the modular valve of the present invention in a wet system configuration.

Certain terminology is used in the following description for convenience only and is not limiting. The words "right," "left", "lower" and "upper" designate directions in the drawings to which reference is made. The words "inwardly" and "outwardly" refer to directions toward and away from, respectively, the geometric center of the valve and designated parts thereof. The terminology includes the words above specifically mentioned, derivatives thereof and words of similar import.

Referring to the drawings in detail, wherein like numerals indicate like elements throughout, there is shown in FIGS. 1-13 a preferred embodiment of a valve, generally designated 10 in accordance with the present invention. The valve 10 is preferably a system valve for a sprinkler system (not shown). The valve 10 shown in FIGS. 1 and 5-9 is preferably used in connection with a wet system. However, it is understood by those skilled in the art that the present invention is not limited to using the valve 10 in connection with a sprinkler system. That is, the valve 10 could function as a standard check valve or as a check valve with a degree of control, as described in more detail hereinafter. For purposes of convenience only, the following description of the valve 10 used in connection with a wet system also refers to FIGS. 2 and 3, which depict a dry system valve, since many elements are common to both configurations.

Referring now to FIG. 1, the valve 10 has a valve body 12 which includes an inlet 14 for being in fluid communication with a fluid source 16 and an outlet 18 for being in fluid communication with an outlet conduit 20. The inlet and outlet 14, 18 are preferably generally aligned and are generally tubular in shape. The fluid source 16 is sized to complement the inlet 14 and is preferably in the form of a tubular conduit which abuts the inlet 14. A groove 22 is located around the periphery of the inlet 14 and the conduit of the fluid source 16 for allowing a coupling 21 to interconnect the inlet 14 and fluid source 16 in a fluid-tight manner. The coupling 21 includes a gasket 21a for sealing the inlet 14 and fluid source 16. Such couplings are available from Victaulic Company of America in Easton, Pa. and are well understood by those skilled in the art. Accordingly, further description thereof is omitted for purposes of convenience only and is not limiting. The fluid source 16 is preferably directly connected to a suitable water supply as in conventional standpipe applications.

In the present embodiment, the outlet conduit 20 is preferably generally tubular shaped to complement and engage the end surface of the outlet 18 in an abutting manner. The periphery of the outlet 18 and outlet conduit 20 include a circumferential groove 22 for receiving a coupling 21 to interconnect the outlet 18 and outlet conduit 20 in the fluid-tight manner, as described above in connection with the inlet 14 and fluid source 16. In the present embodiment, it is preferred that the outlet conduit 20 be comprised of a standard building standpipe, as is well understood by those skilled in the art. However, it is also understood by those skilled in the art that the outlet 18 could be in fluid communication with any type of piping system, without departing from the spirit and scope of the invention.

While in the present embodiment it preferred that the inlet 14 and outlet 18 be coupled to the fluid source 16 and outlet conduit 20, respectively, by a coupling 21, it is understood by those skilled in the art that other means could be utilized for securing the inlet 14 and outlet 18 with the fluid source 16 and outlet conduit 20, respectively. For instance, a sealed flanged bolt connection (not shown) could also be used without departing from the spirit and scope of the invention.

As shown in FIG. 1, the valve 10 includes a passage 24 within the valve body 12 interconnecting the inlet 14 and outlet 18 for allowing fluid 26 to flow through the valve body 12 between the inlet 14 and outlet 18 under conditions hereinafter described. The walls of the valve body 12 extend outwardly in the passage area 26 to provide a large cavity for housing the control elements of the valve 10, as described in more detail hereinafter. The left side of the valve body 12 includes an aperture 28 for accessing the passage 24. A cover plate 30 and gasket 32 are bolted to the valve body 12 with a plurality of bolts 34 to prevent fluid from passing through the aperture 28.

The cover plate 30 allows the valve 10 to be field converted to a dry system valve without the need to remove the valve 10 from its installed position, as described in more detail hereinafter. Accordingly, if it were not desired to have a convertible valve, the valve body 12 may be formed without the aperture 28 to thereby omit the necessity for the cover plate 30.

As shown in FIG. 1, the right side of the valve body 12 also includes an aperture 36 for providing access to the passage 24. A mounting plate 38 is bolted over the aperture 36 with a gasket 40 positioned between the mounting plate 38 and the valve body 12 for preventing fluid from passing therebetween. The mounting plate 38 is preferably secured to the valve body 12 by a plurality of spaced bolts 42, as is well understood by those skilled in the art. The mounting plate 38 is used to mount various linkage and control elements for the valve 10, as described in more detail hereinafter.

In the present embodiment, it is preferred that the valve body 12 be constructed of a high-strength metallic material, such as iron. It is further preferred that the valve body 12 be constructed by a casting process. However, it is understood by those skilled in the art that other materials and processes of manufacture can be used without departing from the spirit and scope of the invention. For instance, the valve body 12 could be constructed of machined stainless steel or of a molded composite fibrous material. It is also understood by those skilled in the art that the present invention is not limited to the general overall shape of the valve body 12 shown in the drawings. That is, the valve body 12 can be configured in other manners, such as orienting the inlet 14 and outlet 18 at a right angle, without departing from the spirit and scope of the invention.

As shown in FIG. 1, a valve seat 44 is positioned within the valve body 12 in alignment with the passage 24 for allowing fluid 26 to flow therethrough. More particularly, the interior of the valve body 12, where the inlet 14 meets the passage 24, includes a shoulder 46 for receiving the valve seat 44. The valve seat 44 is generally annularly shaped and is sized to frictionally fit within the passage 24 at the shoulder 46. While it is preferred that the valve seat 44 be frictionally fit within the passage 24 at the shoulder 46, it is understood by those skilled in the art that the valve seat 44 could be configured in other manners and secured within the passage 24 through other methods. For instance, the valve seat 44 could be of the two-piece type without departing from the spirit and scope of the invention.

In the present embodiment, the valve seat 44 is preferably constructed of a high strength metallic material, such as copper. However, it is understood by those skilled in the art that the valve seat 44 could be constructed of other materials, such as brass, stainless steel or a metallic alloy. The valve seat 44 is preferably constructed by a machining process, but may be constructed by other methods without departing from the spirit and scope of the invention. While it is preferred that the valve seat 44 be a separate element which is secured within the valve body 12, it is understood by those skilled in the art that the valve seat 44 could be integrally formed as part of the valve body 12, without departing from the spirit and scope of the invention.

As shown in FIG. 1, a clapper 48 is positioned within the passage 24 in alignment with the valve seat 44. The clapper 48 is preferably constructed of a metallic material, such as a manganese-bronze alloy, and is preferably generally disc-shaped. The outside diameter of the clapper 48 is slightly larger than the outside diameter of the valve seat 44. A seal 50 is secured to the underside of the clapper 48 for providing a fluid-tight seal between the valve seat 44 and clapper 48 when the clapper 48 is in the closed position, as described hereinafter. The seal 50 is preferably constructed of an elastomeric material to provide the requisite flexible characteristics, as is well understood by those skilled in the art. However, the clapper 48 and seal 50 could be constructed of other materials, without departing from the spirit and scope of the invention.

Figure 2:
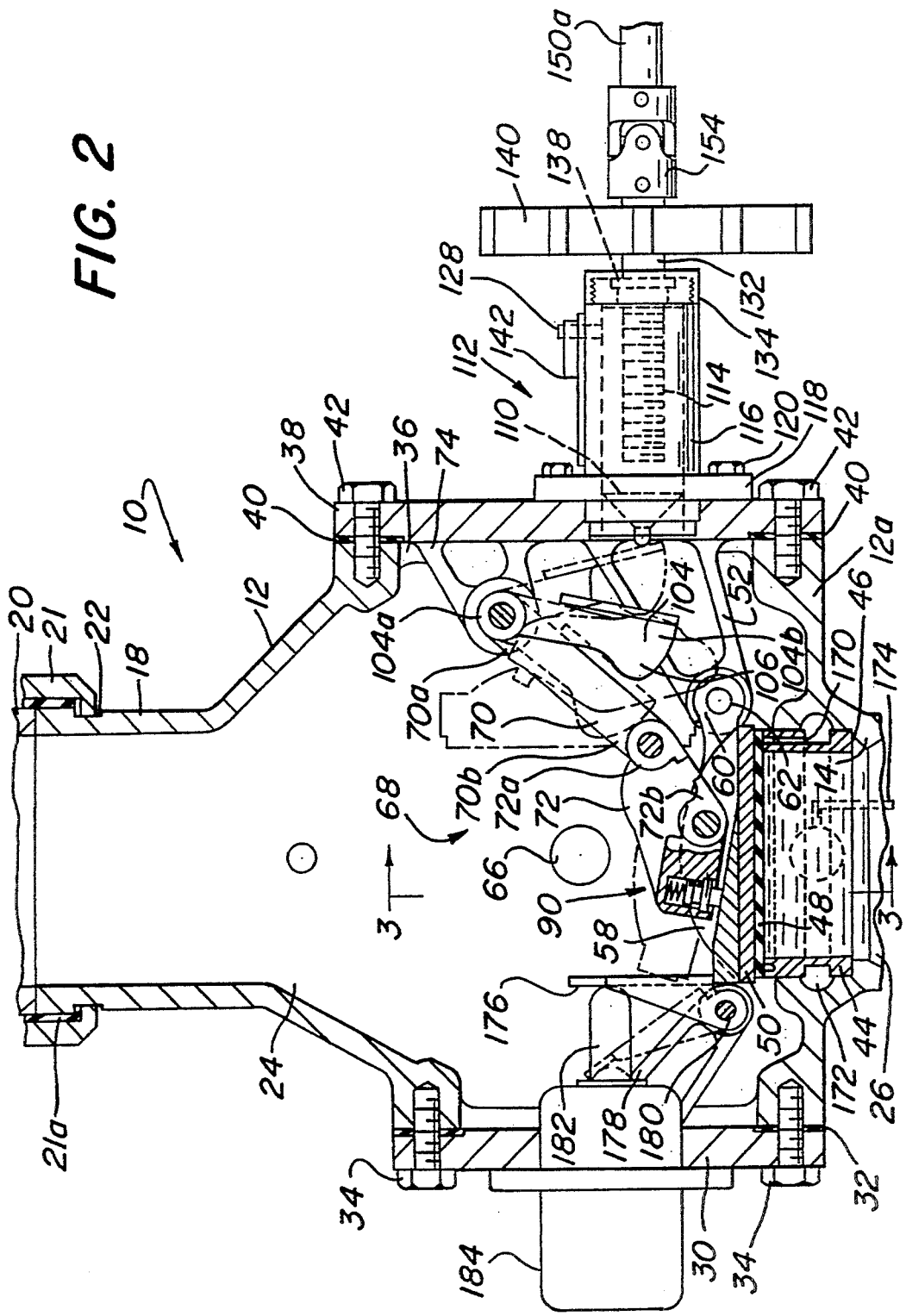
FIG. 2 is an elevational view, partially in cross section, of the modular valve of the present invention in a dry system configuration.
Figure 3:
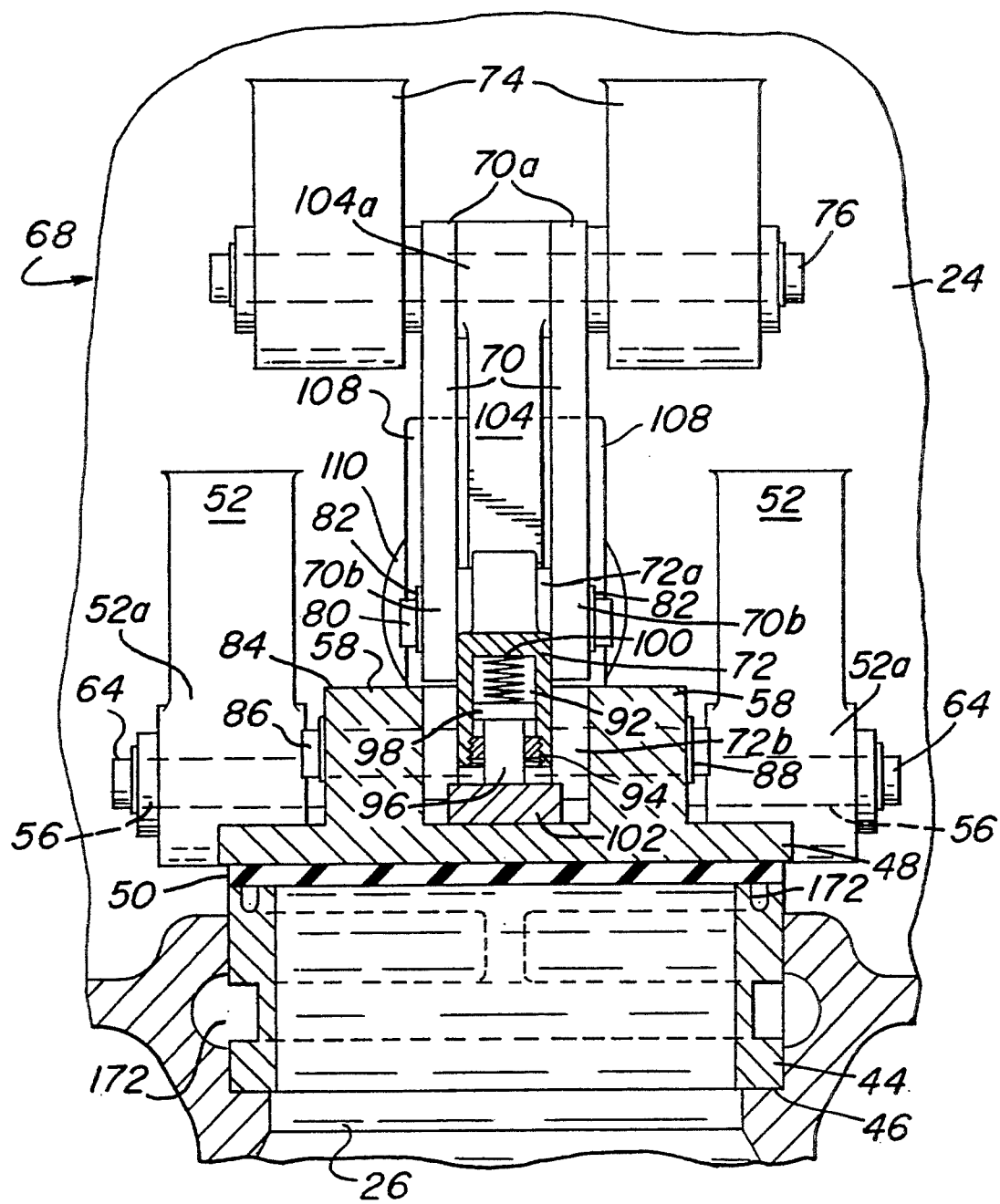
FIG. 3 is an enlarged cross-sectional view of the valve shown in FIG. 2 taken along lines 3—3 of FIG. 2.

Referring now to FIGS. 1–3, a hinge means is interconnected between the valve body 12 and the clapper 48 for allowing the clapper 48 to pivot between a first position (shown in solid lines in FIG. 1) wherein the clapper 48 is sealingly engaged with the valve seat 44 to prevent fluid 26 from flowing between the inlet 14 and outlet 18 and a second position (shown in phantom in FIGS. 1 and 2) wherein the clapper 48 is spaced from the valve seat 44 to allow fluid 26 to flow from the inlet 14 toward the outlet 18. In the present embodiment, it is preferred that the hinge means comprise a first member 52 positioned within the passage 24 and extending from the valve body 12 into the passage 24. More particularly, the first member 52 extends from the mounting plate 38 of the valve body 12. The first member 52 has a first end 52a positioned proximate the valve seat 44 and a second end 52b secured to the mounting plate 38. The clapper 48 is pivotally mounted to the first end 52a of the first member 52 such that the clapper 48 is moveable between the first and second positions.

More particularly, as shown in FIG. 3, the first member 52 is preferably comprised of a pair of first members 52, each having a first end 52a positioned proximate the valve seat 44 and a second end 52b secured to the mounting plate 38. That is, the second end 52b of each of the first members 52 is preferably cast to the mounting plate 38, by a standard casting process well understood by those skilled in the art. However, it is also understood by those skilled in the art that the second end 52a of each of the first members 52 could be bolted to the mounting plate 38 by bolts extending through suitably sized apertures in the mounting plate 38 into threaded bores within the first members 52. In addition, the first members 52 could be secured to the mounting plate 38 in other manners, such as by welding or an interlocking relationship. As best shown in FIG. 2, each of the first members 52 includes a cutout portion 54 extending through the body thereof to reduce the overall weight of the first members 52. The first end 52a of each of the first members 52 also includes a bore 56 extending therethrough, as shown in FIG. 3.

Referring now to FIGS. 2 and 3, a pair of arms 58 extend upwardly from the clapper 48 and include a generally curved upper surface. As best shown in FIG. 3, the arms 58 are spaced apart and extend generally parallel to the first members 52. Extending from each arm 58 toward the mounting plate 38 is a finger 60. Each finger 60 has a rounded end and a bore 62 extending therethrough. The bore 62 in each finger 60 is generally aligned with the bore 56 in each first member 52. A cylindrical pin 64 extends through the bore 62 of each finger 60 and the bore 56 of each first member 52. The pin 64 is sized to permit rotation between the first members 52 and fingers 60. Thus, the pin connection permits the clapper 48 to pivot with respect to the valve body 12.

While it is preferred that the clapper 48 pivot with respect to the valve body 12 by the use of the first members 52, arms 58, fingers 60 and pin 64, it is understood by those skilled in the art that other structures could be utilized for permitting the clapper 48 to pivot with respect to the valve body 12. For instance, the clapper 48 could be pivotally mounted to the mounting plate 38 by a single first member 52 and finger 60 without departing from the spirit and scope of the invention. Moreover, the first members 52 could be directly mounted to the valve body 12 along the bottom wall 12a thereof without departing from the spirit and scope of the invention.

Referring now to FIGS. 1 and 2, the valve body 12 further includes a drain port 66 in fluid communication with the passage 24. The drain port 66 is positioned .between the clapper 48 and the outlet 18. More particularly, it is preferred that the drain port be positioned proximate the clapper 48 between the clapper 48 and outlet 18. The drain port 66 includes a suitable valve (not shown) for selectively permitting fluid within the passage 24 to pass through the drain port 66 to drain the passage 24 and the system to which the valve 10 is connected. Positioning the drain port 66 proximate the clapper 48 permits the valve 10 to be substantially drained and readily reset after the system has been activated, as described in more detail hereinafter.

While it is preferred that the drain port 66 be positioned between the clapper 48 and outlet 18, it is understood by those skilled in the art that the drain port 66 can be located anywhere on the valve body 12 so long as substantially all of the fluid 26 can be drained from the passage 24. For instance, the drain port 66 could be located in the bottom wall 12a of the valve body 12 (not shown), without departing from the spirit and scope of the invention.

As shown in FIG. 1, the valve body 12 further includes a supply test port 67 in fluid communication with the fluid source 16. The supply test port 67 is preferably positioned between the clapper 48 and the inlet 14. More particularly, it is preferred that the supply test port 67 be positioned proximate the clapper 48 between the clapper 48 and inlet 14. The supply test port includes a suitable valve (not shown) for selectively permitting fluid within the inlet 14 to pass through the supply test port 67 to confirm whether adequate supply pressure of fluid is being provided.

Referring now to FIG. 2, the valve 10 further includes operator means for controlling the position of the clapper 48 with respect to the valve seat 44. The operator means securely retains the clapper 48 in the first position (i.e., closed) in a first mode of operation and allows the clapper 48 to freely move between the first and second positions (i.e., open) in a second mode of operation, (i.e., check valve). Thus, when operating in the second mode, the clapper 48 moves to the first position when fluid 26 flows through the passage 24 from the outlet 18 toward the inlet 14, and the clapper 48 moves to the second position when fluid 26 flows through the passage 24 from the inlet 14 toward the outlet 18. In the present embodiment, it is preferred that the operator means comprise linkage 68 within the passage 24. The linkage 68 is interconnected between the clapper 48 and the valve body 12, as described in more detail hereinafter. It is also preferred that the operator means further comprise actuator means slideably engaged with the linkage 68 for moving the linkage 68 with respect to the clapper 48 and valve body 12 to thereby move the clapper 48 with respect to the valve seat 44.

Referring now to FIG. 2, the linkage 68 comprises a first linkage member 70 having a first end 70a and a second end 70b and a second linkage member 72 having a first end 72a and a second end 72b. The first linkage member 70 is preferably comprised of a pair of spaced apart first linkage members 70, each having a first end 70a and a second end 70b, as best shown in FIG. 3. The first linkage members 70 have a predetermined length between the first and second ends 70a, 70b thereof. The second linkage member 72 also has a predetermined length between the first and second ends 72a, 72b thereof. In the present embodiment, it is preferred that the predetermined length of the first linkage members 70 be greater than the predetermined length of the second linkage member 72, to assist in locking the clapper 48 in the first position, as described in more detail hereinafter. However, it is understood by those skilled in the art that the second linkage member 72 could have a greater predetermined length than the first linkage members 70, without departing from the spirit and scope of the invention.

The first ends 70a of the first linkage member 70 are preferably pivotally mounted to the valve body 12. In the present embodiment, it is preferred that the first ends 70a of the first linkage members 70 be pivotally mounted by a standard hinge pin connection 76 to a pair of corresponding spaced support arms 74 extending from the mounting plate 38. The support arms 74 are preferably secured to the mounting plate 38 in the same manner that the first members 52 are secured to the mounting plate 38, as described above. As shown in FIG. 3, the second ends 70b of the first linkage members 70 are pivotally mounted to the first ends 72a of the second linkage members 72. That is, the second ends 70b of the first linkage members 70 and the first end 72a of the second linkage members 72 each include aligned bores 78 extending therethrough for rotatably receiving a pin 80 to thereby provide the pivotable connection. The ends of the pin 80 include snap rings 82 for retaining the pin 80 within the bores 78, as is well understood by those skilled in the art.

The second end 72b of the second linkage member 72 is pivotally mounted to the clapper 48. That is, the second end 72b of the second linkage member 72 is positioned between the arms 58 of the clapper 48. A bore 84 extends through the arms 58 of the clapper 48 and the second end 72b of the second linkage member 72 for rotatably receiving a pin 86 to thereby permit the second linkage member 72 to pivot with respect to the clapper 48. The pin 86 includes snap rings 88 at the ends thereof for securely retaining the pin 86 within the bore 84.

Referring now to FIGS. 2 and 3, the linkage 68 preferably includes biasing means for initially biasing the clapper 48 from the first position toward the second position. In the present embodiment, it is preferred that the biasing means be mounted on the second linkage member 72 for engagement with the clapper 48 when the clapper 48 is in the first position for biasing the first end 72a of the second linkage member 72 toward the bottom wall 12a of the valve body 12 to move the clapper 48 toward the second position.

In the present embodiment, the biasing means is preferably comprised of a nose spring 90 positioned within a portion of the second linkage member 72 which extends from the second end 72b thereof. As best shown in FIG. 3, the nose spring 90 is positioned within a bore 92 in the second linkage member 72 which faces the clapper 48. A portion of the bore 92 is threaded for threadably receiving an annular nut 94. A button 96 extends through the nut 94 and includes a flange 98 for preventing the button 96 from passing through the nut 94. A coil spring 100 is positioned between the flange 98 and the bottom of the bore 92 for biasing the button 96 downwardly toward the clapper 48. The clapper 48 includes a raised block 102 for insuring that the button 96 engages the clapper 48 when the clapper 48 is in the first position.

When the clapper 48 is in the first position, the spring 100 biases the button 96 downwardly into engagement with the raised block 102 thereby applying a force to the bottom of the bore 92 which moves the first end 72a of the second linkage member 72 downwardly toward the bottom wall 12a of the valve body 12. The nose spring 90 assists in moving the clapper 48 from the first position to the second position, as described in more detail hereinafter.

While in the present embodiment, it is preferred that the biasing means be comprised of the above-described nose spring 90, it is understood by those skilled in the art that other means could be utilized for biasing the first end 72a of the second linkage member 72 downwardly toward the bottom wall 12a of the valve body 12. For instance, a coil spring (not shown) could be interconnected between the first end 72a of the second linkage member 72 and one of the fingers 60 which extend from the clapper 48, without departing from the spirit and scope of the invention.

While in the present embodiment, it is preferred that the linkage 68 be comprised of the first and second linkage members 70, 72, it is understood by those skilled in the art that the present invention is not limited to any particular linkage 68 as long as the clapper 48 is allowed to assume the first and second positions.

Figure 5:
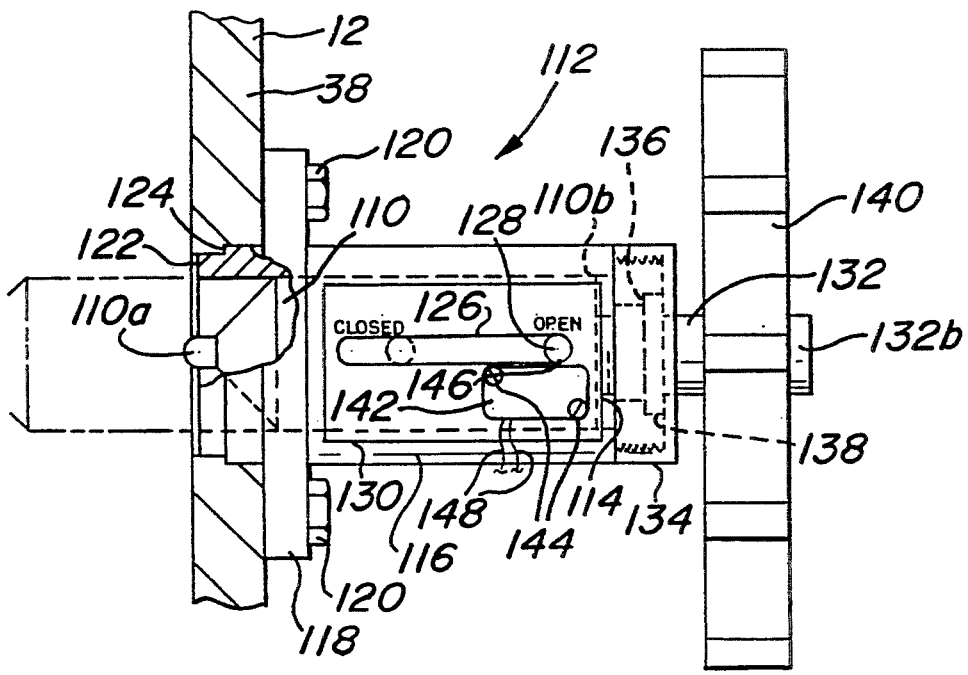
FIG. 5 is a greatly enlarged elevational view, partially in cross section, of an operator for the modular valve shown in FIGS. 1 and 2.

Referring now to FIGS. 2 and 5, it is preferred that the actuator means be slideably engaged with at least one of the first and second linkage members 70, 72. In the present embodiment, it is preferred that the actuator means comprise a third linkage member 104 having a first end 104a, pivotally mounted to the valve body 12. That is, the first end 104a of the third linkage member 104 is pivotally mounted to the pin connection 76 between the first linkage members 70 and the support arms 74, as best shown in FIG. 3. The second end 104b of the third linkage member 104 includes a rounded head 106 for engaging the second linkage member 72 when the second linkage member 72 is positioned between the first linkage members 70, as described in more detail hereinafter. The third linkage member 104 also includes a pair of generally flat flanges 108 extending generally perpendicularly from the third linkage member 104 in a generally parallel manner for engagement with the underside of the first linkage members 70, as is also described in more detail hereinafter.

In the present embodiment, it is preferred that the cover plate 30, mounting plate 36, first members 52, linkage 68 and third linkage member 104 be constructed of a high strength, lightweight metallic material, such as aluminum, which can be formed by a standard machining processes. However, it is understood by those skilled in the art that the cover plate 30, mounting plate 36, first members 52, linkage 68 and third linkage member 104 could be constructed of other materials and in other manners, without departing from the spirit and scope of the invention. For instance, the above-mentioned elements could be constructed of other metallic materials, such as stainless steel, brass, or copper.

Referring now to FIGS. 2 and 5, in the present embodiment, it is preferred that the actuator means further comprise drive means for moving the third linkage member 104 into engagement with the linkage 68. It is preferred that the drive means comprise a rod 110 having a first end 110a positioned within the passage 24 and a second end 110b positioned externally of the valve body 12. The rod 110 is reciprocally mounted on the valve body 12 such that the first end 110a of the rod 110 reciprocates within the passage 24 toward and away from the third linkage member 104. That is, the third linkage member 104 is in selective sliding engagement with the rod 110. As the rod 110 moves toward the third linkage member 104 when the clapper 48 is in the second position, the rod 110 engages the third linkage member 104 and moves the third linkage member 104 toward the linkage 68 into engagement with at least one of the first and second linkage members 70, 72 such that the first linkage members 70 pivot about the first end 70a thereof in a clockwise direction to thereby force the second end 72b of the second linkage member 72 toward the valve seat 44 to secure the clapper 48 in the first position.

More particularly, when the clapper 48 is in the fully opened position and the rod 110 engages the third linkage member 104, the third linkage member 104 moves toward the first and second linkage members 70, 72 such that the rounded head 106 engages the second linkage member 72 to thereby cause the second linkage member 72 to pivot about the first end 72a thereof to thereby force the second end 72b of the second linkage member 72 toward the valve seat 44. The flanges 108 of the third linkage member 104 then engage the first linkage members 70 such that the first linkage members 70 pivot about the first ends 70a thereof to thereby further force the second end 72b of the second linkage member 72 toward the valve seat 44 to secure the clapper 48 in the first or closed position.

Referring now to FIGS. 2 and 5, to reciprocally move the rod 110 on the valve body 12, the drive means further comprises a nut and screw mechanism 112 operatively associated with the rod 110 for moving the rod 110 axially with respect to the valve body 12. The nut and screw mechanism 112 is preferably manually controlled and, more particularly, includes a threaded bore 114 extending into the second end 110b of the rod 110 which is preferably centrally disposed along the longitudinal axis of the rod 110.

The nut and screw mechanism 112 further includes means for rotatably fixing the rod with respect to the valve body 12. In the present embodiment, the means for rotatably fixing the rod 110 is comprised of a generally tubular housing 116 which is sized to complementarily receive the rod 110 therein in a reciprocal fashion. The tubular housing 116 includes a mounting flange 118 extending outwardly therefrom which is bolted to the mounting plate 38 by standard bolts 120. The tubular housing 116 is secured within a suitably sized aperture 122 in the mounting plate 38. The mounting plate 38 and tubular housing 116 include a cooperating stepped portion 124 for aligning the tubular housing 116 on the mounting plate 38 at the proper position, as is well understood by those skilled in the art.

As shown in FIG. 5, the tubular housing 116 includes a longitudinal slot 126 for slideably receiving a pin 128 radially extending from the second end 110b of the rod 110. The pin 128 is slideably disposed within the slot 126 to limit the rotational movement of the rod 110 and thereby assist in controlling the position of the clapper 48 between the first or closed position and the second or open position. A label 130 marked "open" at one end of the slot 126 and "closed" at the other end of the slot 126 assists in informing the operator of the position of the clapper 48 may assume. That is, when the pin 128 indicates that the clapper 48 is in the second or open position, the operator knows that the clapper 48 can move between the first and second positions and will assume either the first or second position depending upon whether the fluid 26 is flowing from the inlet 14 toward the outlet 18 or from the outlet 18 toward the inlet 14, as described above.

A complementary first threaded shaft 132 is threadably positioned within the threaded bore 114 such that rotation of the first threaded shaft 132 causes the rod 110 to move reciprocally with respect to the valve body 12 and tubular housing 116. As shown in FIG. 5, the distal end of the tubular housing 116 includes external threads for threadably receiving an end cap 134. The end cap 134 includes a shoulder 136 for receiving a flange 138 extending radially outwardly from the first threaded shaft 132. Thus, the end cap 134 permits the threaded shaft 132 to rotate with respect to the tubular housing 116 while at the same time preventing the first threaded shaft 132 from moving axially with respect to the tubular housing 116. The first threaded shaft 132 includes a distal end 132b which is accessible externally of the valve body 12. An annular handle 140 is fixed to the distal end 132b of the first threaded shaft 132 to assist an operator in rotating the first threaded shaft 132 to thereby move the rod 110 between the open and closed positions.

As shown in FIG. 5, the drive means further comprises indicator means positioned externally of the valve body 12 for indicating a position of the rod 110 with respect to the valve body 112 to thereby indicate whether the clapper 48 is securely retained in the first or closed position or is free to move between the first or closed and second or open positions. In the present embodiment, the indicator means is preferably comprised of the label 130, slot 126 and pin 128 described above. The indicator means further comprises a switch 142 mounted to the tubular housing 116 proximate the slot 126. The switch 142 is secured to the tubular housing 116 by standard fastening elements, such as screws 144. The switch 142 includes a trigger 146 which is biased outwardly. As the pin 128 moves from the end of the slot 126 which is marked "open", the trigger 146 springs outwardly from the switch 142 to thereby send an electrical signal to an alarm or the like (not shown) via the wires 148 to thereby remotely indicate that the valve 10 is not fully openable if operating as a check valve. Similarly, as the pin 128 approaches the end of the slot 126 which is marked "open", the pin 128 pushes the trigger 146 inwardly toward the switch 142 to open a control circuit and remotely indicate that the valve 10 has been opened or can be fully opened if operating as a check valve.

While in the present embodiment it is preferred that the actuator means be comprised of the third linkage member 104 and the drive means or nut and screw mechanism 112, it is understood by those skilled in the art that other means could be utilized for actuating the first and second linkage members 70, 72. For instance, the rod 110 could be hydraulically or pneumatically controlled, actuated by a servo motor and/or directly be engaged with the first and second linkage members 70, 72, without departing from the spirit and scope of the invention. Therefore, the present invention is not limited to any particular method of reciprocally moving the rod 110 with respect to the valve body 12. Moreover, the rod 110 can directly engage the clapper 48 to control the position thereof.

Referring now to FIG. 1, if desired, the valve 10 could further include a second threaded shaft 150 having a first end 150a and a second end 150b. The first end 150a of the second threaded shaft 150 is coupled to the first threaded shaft 132 such that the second threaded shaft 150 rotates therewith. The second threaded shaft 150 extends away from the first threaded shaft 132 through a wall 152 such that the valve 10 is positioned on one side of the wall 152 and the second end 150b of the second threaded shaft 150b is positioned on the other side of the wall 152. The first end 150a of the second threaded shaft 150 is coupled to the first threaded shaft 132 by a universal coupling joint 154, as is well understood by those skilled in the art. However, it is also understood by those skilled in the art that the first end 150a of the second threaded shaft 150 need only be operatively coupled to the first threaded shaft 132. For instance, the second threaded shaft 150 could be directly coupled to the handle 140, without departing from the spirit and scope of the invention.

The second threaded shaft 150 extends through an aperture 156 in the wall 152 and is rotatably supported therein by a pair of mounting plates 158 bolted to each side of the wall 152 by a plurality of bolts 160. The mounting plates 158 include bearings (not shown) for permitting the second threaded shaft 150 to readily rotate with respect thereto. The second end 150b of the second threaded shaft 150 includes a handle 162 keyed thereto for allowing an operator (not shown) to rotate the handle 162, second threaded shaft 150, and the first threaded shaft 132 to thereby reciprocate the rod 110.

While it is preferred that the second threaded shaft 150 extend through a wall 152 which is placed a distance from the valve 10, it is understood by those skilled in the art that the wall 152 could be omitted and that the second threaded shaft 150 could just extend a significant distance from the valve 10 to insure the safety of the operator.

As shown in FIG. 1, the second threaded shaft 150 includes second indicator means positioned on the other side of the wall 52 for indicating a position of the rod 110 with respect to the valve body 12. In the present embodiment, the second indicator means is generally identical to the first indicator means except that the rod 110 is replaced with a nut 164 which reciprocates within the tubular housing of the second indicator means. Since the first and second indicator means are generally identical, further description thereof is omitted for purposes of convenience only and is not limiting.

Referring now to FIG. 1, the valve 10 preferably includes fluid flow sensing means positioned within the passage 24 for sensing fluid 26 flowing between the inlet 14 and outlet 18. In the present embodiment, the fluid flow sensing means is comprised of an electric paddle switch 166 positioned proximate the outlet 18 within the valve 10 or within the outlet conduit 20 just downstream of the valve 10. Incorporating the paddle switch 166 within the valve body 12 reduces installation expense since conventional flow switches are installed within the sprinkler system far downstream from the system valve thereby requiring different size flow switches in accordance with the size of the pipe for which it is to be installed. Thus, the paddle switch 166 of the present invention enables one switch to fit all sprinkler systems. The mounting and operation of the paddle switch 166 are well understood by those skilled in the art. Accordingly, further description thereof is omitted for purposes of convenience only and is not limiting.

As shown in FIG. 1, the valve also includes alarm actuation means for actuating an alarm when the clapper 48 moves from the first or closed position toward the second or open position such that fluid flows from the inlet 14 to the outlet 18 through the passage 24. In the present embodiment, it is preferred that the alarm actuation means be comprised of a standard water motor alarm system 168 in fluid communication with the face of the valve seat 44. That is, the valve seat 44 includes a series of vertically extending bores 170 which are in fluid communication with an annular groove 172 which extends around the face of the valve seat 44 and valve body 12. The vertically extending bores 170 are also in fluid communication with the passage 24 when the clapper 48 is in the second or open position to thereby allow fluid to pass through the vertically extending bores 170, groove 172 and a conduit 174 into the water motor alarm system 168. Water motor alarm systems and the actuation thereof are well known to those skilled in the art and, therefore, further description thereof is omitted for purposes of convenience only and is not limiting.

The foregoing description of the valve 10 is directed to the valve 10 being configured for a wet sprinkler system. To place the valve 10 in the set condition, the handle 140 is rotated until the pin 128 indicates that the rod 110 and clapper 48 are in the second or open position. The sprinklers (not shown) which are downstream from the valve 10 are all placed in the set or closed position and fluid 26 is introduced through the inlet 14, passage 24 and outlet 18 into the sprinkler system, as shown in FIG. 8. As fluid flows in to the system, air is purged from the system in a manner well known to those skilled in the art. Once the sprinkler system has been fully loaded or charged with fluid, the valve 10 acts as a check valve whereby the fluid pressure within the sprinkler system forces the clapper 48 downwardly into sealed engagement with the valve seat 44, as shown in FIG. 6.

When a sprinkler head opens, the clapper 48 moves to the second or open position as a result of the loss of closing pressure above the clapper 48 to thereby allow fluid 26 to flow through the passage 24 to the open sprinkler head, thereby activating the system, as shown in FIGS. 6 and 7. Once a fire has been brought under control, and it is desired to shut down the sprinkler system, the operator may access the valve 10 proximate thereto by using the handle 140 or may access the valve 10 a distance from the valve 10, such as on the other side of the wall 152, by rotating the handle 162. As the rod 110 moves inwardly into the passage 24, the first end thereof 110a engages the third linkage member 104 and moves the same into engagement with the second linkage member 72 which thereby pivots about its second end 72b. As the third linkage member 104 continues to move toward the first and second linkage members 70, 72, the second linkage member 72 falls away from the third linkage member 104 and the flanges 108 engage the first linkage members 70 to force the first linkage members 70 to pivot about the second end 70b thereof to further force the first end 72a of the second linkage member 72 downwardly thereby forcing the clapper 48 into sealed engagement with the valve seat 44, as shown in FIG. 9. The pin 128 on the tubular housing 116 provides an indication to the operator regarding the position of the clapper 48. Once the clapper 48 has been moved to the first or closed position, the system can be drained through the drain port 66 and the sprinkler heads may then be closed. Once the sprinkler system has been closed, the rod 110 can be moved away from the passage 24 in order to allow fluid to reenter the system and place the system in condition for activation, as shown in FIG. 6.

Referring now to FIGS. 2, 4 and 10-13, there is shown a valve 10 which is generally identical to the valve shown in FIG. 1, except that it further includes control means for governing the position of the clapper 48 with respect to the valve seat 44 when the clapper 48 is allowed to freely move between the first and second positions (i.e., the second mode of operation). The control means has a set position wherein the clapper 48 is maintained in the first or closed position and an activated position wherein the clapper 48 is free to move between the first and second positions. A valve 10 which includes the control means of the present invention is preferably configured for a dry piping system, as will be better understood from the description hereinafter.

Referring now to FIG. 2, in the present embodiment, it is preferred that the control means be comprised of a latch 176 positioned proximate the clapper 48 within the passage 24. The latch 176 is moveable between a locked position (shown in solid lines) wherein the latch 176 engages and holds the clapper 48 in the first or closed position and an unlocked position (shown in phantom) wherein the latch 176 is spaced from the clapper 48 when the clapper 48 is in the second or open position.

When the valve 10 is configured for a dry piping system, the cover plate 30 is modified to include a support arm 178. The support arm 178 extends inwardly from the cover plate 30 to a point proximate the clapper 48. The support arm 178 is secured to the cover plate 130 in a manner which is generally identical to that described above in connection with the first members 52 and the mounting plate 38. The latch 176 is pivotally mounted to the support arm 178 by a standard hinge pin connection 180. A spring (not shown) is interposed between the support arm 178 and the latch 176 for biasing the latch 176 to the unlocked position for reasons described in more detail hereinafter. Latches for dry system valves are well known to those skilled in the art. Accordingly, further description thereof is omitted for purposes of convenience only and is not limiting.

Referring now to FIG. 2, the control means further comprises an actuator member 182 mounted on the valve body 12 and extending into the passage 24 such that the actuator member 182 engages the distal end of the latch 176. The actuator member 182 is movable between a set position (shown in solid lines) wherein the latch 176 is maintained in the locked position and an activated position (shown in phantom) wherein the latch 76 is in the unlocked position.

Figure 4:
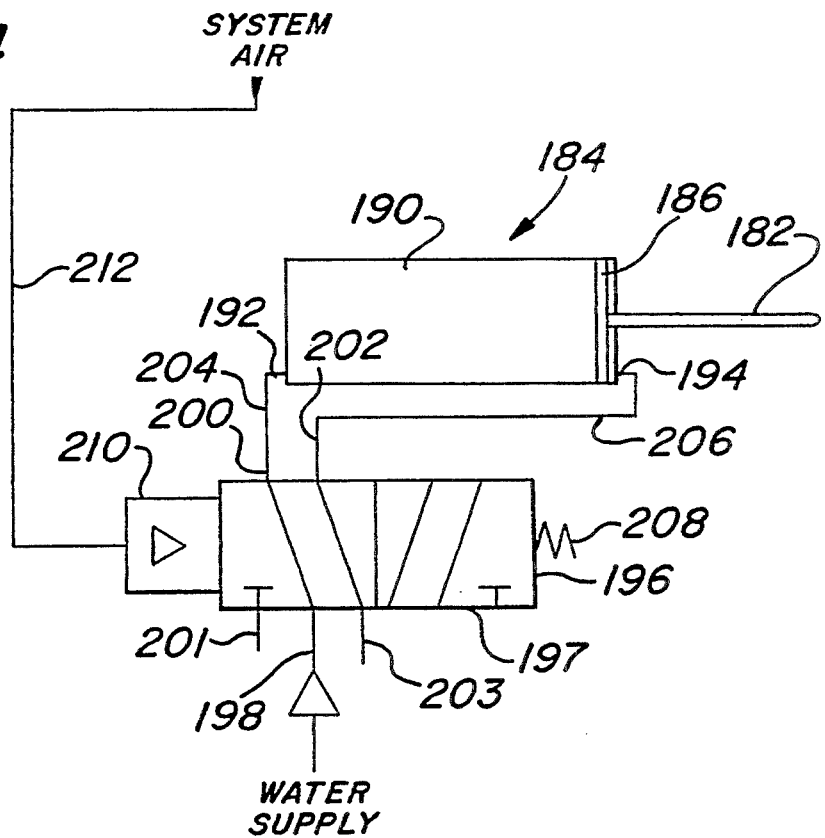
FIG. 4 is a schematic view of a pneumatic/hydraulic circuit for controlling the modular valve of FIG. 2.

Referring now to FIG. 4, in the present embodiment, the actuator member 182 is moved by a double-acting piston mechanism 184 having a piston 186 which is secured to the actuator member 182 such that the actuator member 182 forms a piston rod. The piston 186 and actuator member or piston rod 182 are reciprocally mounted within a hollow cylinder 190. As best shown in FIG. 2, the piston rod 182 is in engagement with the latch 176. The cylinder 190 includes a first inlet 192 for allowing fluid 26 to flow into the cylinder 190 on a head side of the piston 186 and a second inlet 194 for allowing fluid 26 to flow into the cylinder 190 on a rod side of the piston 186.

The control means further comprises force applicator means for applying a first force to the actuator member or piston rod 182 to move the piston rod 182 from the activated position to the set position and to maintain the piston rod 182 in the set position, such that the clapper 48 and latch 176 are in the first and locked positions, respectively. The force applicator means also applies a second force to the actuator member or piston rod 182 to move the piston rod 182 from the set position to the activated position and to maintain the piston rod 182 in the activated position such that the clapper 48 and latch 176 are in the second and unlocked positions, respectively.

Referring now to FIG. 4, in the present embodiment, it is preferred that the force applicator means be comprised of a spool valve 196 having a supply inlet 198, a first outlet 200, a second outlet 202, a first exhaust port 201, and a second exhaust port 203. The supply inlet 198 is in fluid communication with a fluid or water supply. In the present embodiment, it is preferred that the fluid supply for the supply inlet 198 be the same fluid supply for the inlet 14 of the valve 10. The first inlet 192 to the cylinder 190 is in fluid communication with the first outlet 200 via a first conduit 204. The second inlet 194 to the cylinder 190 is in fluid communication with the second outlet 202 via a second conduit 206.

The valve 196 includes a spool 197 (schematically shown) reciprocally mounted therein. The spool 197 has a first position wherein the supply inlet 198 and the first outlet 200 are in fluid communication, the second outlet 202 and second exhaust port 203 are in fluid communication and the first exhaust port 201 is closed. When the spool 197 is in the first position fluid can flow from the fluid supply into the cylinder 190 on the head side of the piston 186 and from the rod side of the piston 186 through the second exhaust port 203 to maintain the piston 186 in the position shown in FIG. 4. The valve 196 also has a second position wherein the supply inlet 198 and the second outlet 202 are in fluid communication, the first outlet 200 and the first exhaust port 201 are in fluid communication and the second exhaust port 203 is closed. When the spool 197 is in the second position, fluid can flow from the fluid supply into the cylinder 190 on the rod side of the piston 186 and from the head side of the piston 186 through the first exhaust port 201 to move the piston 180 toward the left end of the cylinder 190.

In the present embodiment, it is preferred that the valve 196 be a pneumatically operated spool valve which is biased to the second position by a spring 208 incorporated therein. A pneumatically operated diaphragm 210 applies a force to the spool 197 of the valve 196 against the biasing force of the spring 208 to maintain the spool 197 in the first position as long as the pressure on the diaphragm 210 is above a predetermined valve. The diaphragm 210 is in fluid communication with the system air within the sprinkler system via a conduit 212.

More particularly, it is preferred that the first valve be a two-position, four-way solenoid valve available from Parker of Madison, Miss. and sold under the trademark "Parker Gold Ring" which has been slightly modified in accordance with the schematic shown in FIG. 4 and to be pneumatically operated. However, it is understood by those skilled in the art that other valves could be utilized for selectively allowing fluid to flow to and from the first and second inlets 192, 194 of the cylinder 190, such as a hydraulically controlled spool valve or an electrically controlled solenoid valve, without departing from the spirit and scope of the invention.

Figure 10:
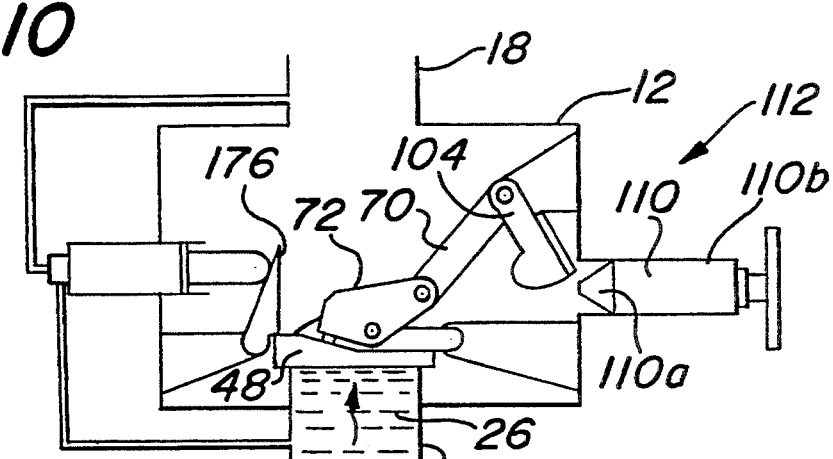
FIG. 10 is a schematic elevational view of the valve shown in FIG. 2 in a set position.
Figure 11:
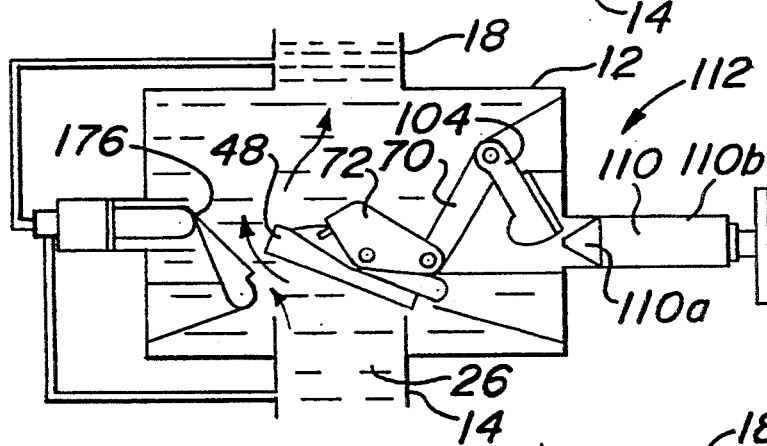
FIG. 11 is a schematic elevational view of the valve shown in FIG. 2 in a partially open activated position.
Figure 12:
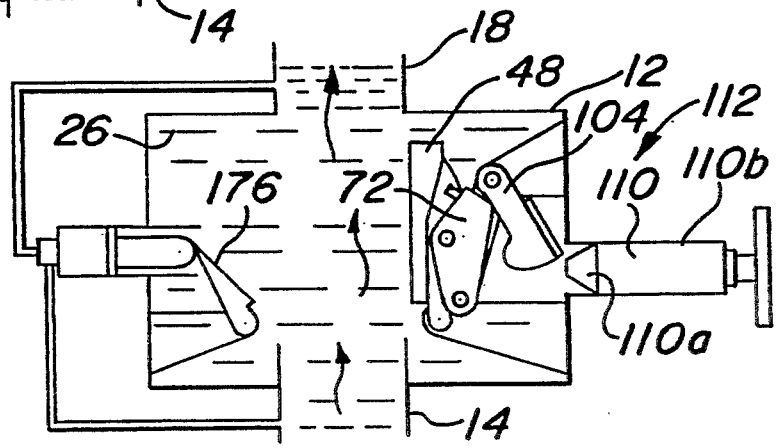
FIG. 12 is a schematic elevational view of the valve shown in FIG. 2 in a fully open activated position.
Figure 13:
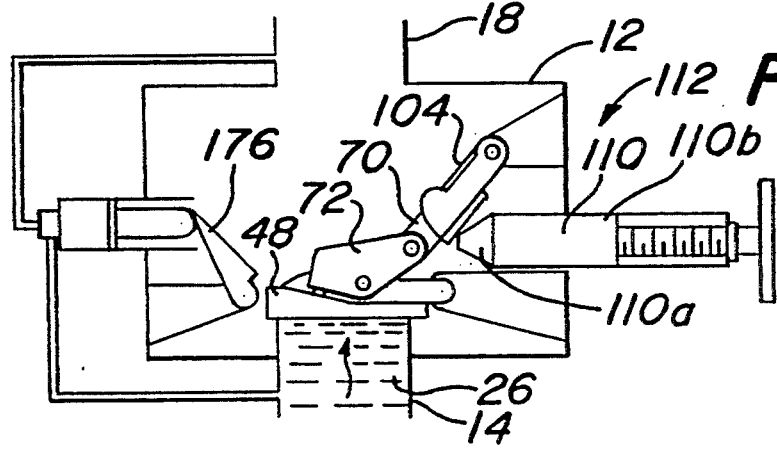
FIG. 13 is a schematic elevational view of the valve of FIG. 2 in a closed position after activation.

Referring now to FIGS. 10–13, to set the valve 10 for a dry piping system, the operator rotates the handle 140 until the rod 110 engages the third linkage member 104 to thereby move the clapper 48 to the first or closed position, as described above and as shown in FIG. 13. Any remaining fluid within the sprinkler system is then drained through the drain port 66. The system is then charged with a gas, such as air, to an appropriate pressure. In the present embodiment, it is preferred that the gas which is in the system be maintained at a pressure of approximately 20 psi. Such a pressure is sufficient to cause the diaphragm 210 of the valve 196 to apply a force to the spool 197 to overcome the biasing force of the spring 208 and assume the first position. As such, once system air is applied through the conduit 212, water is supplied through the supply inlet 198, first outlet 200, conduit 204, first inlet 192, into the head side of the piston 186 while fluid is exhausted from the rod side of the piston 186 through the second inlet 194, conduit 206, second outlet 202 and second exhaust port 203 thereby causing the piston rod 182 to move to the right and engage the latch 176 to force the latch 176 to the locked position. The operator then rotates the handle 140 in a direction to move the rod 110 from the closed to the open position. The latch 176 maintains the clapper 48 in the first or closed position. At this time, the system has been set.

When a sprinkler head (not shown) activates somewhere in the building in which the sprinkler system is installed, the sprinkler head exhausts the air within the system as is well understood by those skilled in the art. When the air pressure within the system drops to a predetermined level, in the present embodiment approximately 15.5 psi +or −¼ psi, the spring 208 in the valve 196 overcomes the system pressure applied to the diaphragm 210 to cause the spool 197 to switch to the second position. As such, fluid from the supply inlet 198 flows through the second outlet 202, conduit 206 and second inlet 194 to the rod side of the piston 186 and fluid is exhausted from the head side of the piston 186 through the first inlet 192, conduit 204, first outlet 200 and first exhaust port 201 causing the piston rod 182 to move to the left to permit the latch 176 to move to the unlocked position shown in phantom in FIGS. 1 and 11.

While it is preferred that the piston rod 182 be moved to the left to permit the latch 176 to pivot to the unlocked position by the application of fluid pressure to the piston 186, it is understood by those skilled in the art that other means could be utilized for applying a force to the piston rod 182. For instance, a coil spring (not shown) could be interposed within the cylinder 190 on the rod side of the piston 186 to bias the piston 186 and piston rod 182 to the left. Accordingly, the present invention is not limited to any particular means for applying the second force to the piston rod 182 and that other means could be utilized without departing from the spirit and scope of the invention.

The force applicator means of the present invention is a quick-acting system since the pressure necessary to maintain the system in a set position is relatively low and because water flowing into the system, upon actuation, through the passage 24 is not as greatly initially inhibited as with prior art systems which require the system to be charged with a higher pressure. In addition, the valve 196 acts to apply a second force to the piston 186 to thereby cause the piston rod 182 to quickly retract from the latch 176 to thereby allow the clapper 48 to move to the second position, as best shown in FIGS. 11 and 12.

When it is desired to reset the valve 10, the operator rotates the handle 140 to cause the rod 110 to move into engagement with the third linkage member 104 and force the clapper 48 to the first or closed position (see FIG. 13), as described in more detail above. Fluid in the system is then drained through the drain port 66 and the system is charged with sufficient air pressure to relatch the latch 176 (see FIG. 10), as described above. Thus, the valve 10 of the present invention is readily reset without having to access the interior of the valve body 12.

A valve 10 which is configured for a dry piping system is field convertible to a wet piping system. To convert a valve 10 from a dry configuration to a wet configuration, the first step is to rotate the handle 140 to move the rod 110 into engagement with the third linkage member 104 until the clapper 48 is securely retained in the first or closed position. Air within the system is then discharged through a system exhaust valve (not shown). As air is exhausted from the system, the double-acting piston mechanism 184 moves the piston rod 182 away from the clapper 48 to thereby move the latch 176 to the unlocked position (see FIG. 13), as described above. The handle 140 is then rotated to move the rod 110 toward the open position, as indicated on the label 130 to thereby permit water to flow from the inlet 14 through the passage 24 and outlet 18 into the sprinkler system (see FIGS. 11 and 12). Prior to permitting the water to flow into the system, the conduit 212 is sealed by suitable valving (not shown) to prevent water from flowing to the diaphragm 210 of the valve 196. As the sprinkler system is filled with water, air is bled from the system in a manner which is known to those skilled in the art. Eventually, the sprinkler system fills with water and the clapper 48 assumes the position shown in FIG. 6.

To field convert the valve 10 from a wet configuration for a wet piping system to a dry configuration for a dry piping system, the handle 140 is rotated until the clapper 48 is securely retained in the first position, as described above. The drain port 66 is then opened to drain substantially all of the fluid 26 from the wet piping system and valve 10, such that the wet piping system becomes a dry piping system, as shown in FIG. 9. The drain port 66 is then closed and the valve (not shown) which sealed the conduit 212 is opened. A gas, such as air, is then supplied through a standard inlet valve (not shown) to charge the valve 10 and piping system to at least 20 psi. When the gas within the system reaches 15.5 psi +or −¼ psi, the double-acting piston mechanism 184 moves to the set position such that the piston rod 182 engages the latch 176 and moves the same to the locked position. At this point, the operator can then rotate the handle 140 to move the rod 110 from the closed position to the open position, as indicated on the label 130 on the tubular housing 116 to thereby permit the clapper 48 to freely move between the first and second positions when the system is activated, as shown in FIG. 10.

While the foregoing description of the valve 10 has been directed to the use of the same within a building standpipe, it is understood by those skilled in the art that the valve 10 could be used, sized and configured in a number of manners. For instance, the valve 10 could be configured as a straight check valve, as an alarm valve, as a dry valve, as a preaction/deluge valve, as a combination control and check valve (i.e., wherein the flow of fluid through the valve is controlled by the position of the clapper 48) and/or any combination of the above valves. Similarly, the present invention is not limited to use as a large system valve, the valve 10 could be sized as a ⅛ inch to 8 inch valve without departing from the spirit and scope of the invention. Accordingly, it is understood by those skilled in the art that the present invention is not limited to configuring the valve 10 in any particular orientation or to using the valve 10 in a particular manner.

From the foregoing description, it can be seen that the present invention comprises a modular valve which can be configured in a number of manners. It will be recognized by those skilled in the art that changes may be made to the above described embodiment of the invention within departing from the board inventive concept thereof. It is understood, therefore, that this invention is not limited to the particular embodiment disclosed, but is intended to cover all modifications which are within the spirit and scope of the invention as defined by the appended claims.

We claim:
1. A valve for a dry piping system, said valve comprising:
   a valve body including an inlet for being in fluid communication with a fluid source and an outlet for being in fluid communication with an outlet conduit;
   a passage within said valve body interconnecting said inlet and said outlet for allowing fluid to flow through said valve body between said inlet and said outlet;
   a valve seat positioned within said valve body in alignment with said passage for allowing fluid to flow therethrough;
   a clapper positioned within said passage;
   hinge means interconnected between said valve body and said clapper for allowing said clapper to pivot between a first position wherein said clapper is sealingly engaged with said valve seat to prevent fluid from flowing between said inlet and said outlet and a second position wherein said clapper is Spaced from said valve seat to allow fluid to flow from said inlet toward said outlet;
   a latch positioned proximate said clapper, said latch being movable between a locked position wherein said latch engages said clapper when said clapper is in said first position and an unlocked position wherein said latch is spaced from said clapper when said clapper is in said second position;
   an actuator member mounted on said valve body and extending into said passage such that said actuator member engages said latch, said actuator member being movable between a set position wherein said latch is maintained in said locked position and an activated position wherein said actuator member is moved to said unlocked position, said actuator member being a double acting piston mechanism having a piston secured to a piston rod, said piston and piston rod being reciprocally mounted within a cylinder, said piston rod being in engagement with said latch, said cylinder having a first inlet for allowing fluid to flow into said cylinder on a head side of said piston and a second inlet for allowing fluid to flow into said cylinder on a rod side of said piston; and
   force applicator means for applying a first force to said actuator member to move said actuator member from said activated position to said set position and to maintain said actuator member in said set position wherein said clapper and latch are in said first and locked positions, respectively, and for applying a second force to said actuator member to move said actuator member from said set position to said activated position and to maintain said actuator member in said activated position wherein said clapper and latch are in said second and unlocked positions, respectively.

2. The valve according to claim 1 wherein said force applicator means comprises a first valve having a supply inlet, a first outlet and a second outlet, said supply inlet being in fluid communication with a fluid supply, said first inlet being in fluid communication with said first outlet, said second inlet being in fluid communication with said second outlet, said first valve having a first position wherein said inlet and said first outlet are in fluid communication for allowing fluid to flow from said fluid supply into said cylinder on said head side of said piston and a second position wherein said supply inlet and said second outlet are in fluid communication for allowing fluid to flow from said fluid supply into said cylinder on said rod side of said piston.

3. A valve for a dry piping system, said valve comprising:
- a valve body including an inlet for being in fluid communication with a fluid source and an outlet for being in fluid communication with an outlet conduit;
- a passage within said valve body interconnecting said inlet and said outlet for allowing fluid to flow through said valve body between said inlet and said outlet;
- a valve seat positioned within said valve body in alignment with said passage for allowing fluid to flow therethrough;
- a clapper positioned within said passage;
- hinge means interconnected between said valve body and said clapper for allowing said clapper to pivot between a first position wherein said clapper is sealingly engaged with said valve seat to prevent fluid from flowing between said inlet and said outlet and a second position wherein said clapper is spaced from said valve seat to allow fluid to flow from said inlet toward said outlet;
- a latch positioned proximate said clapper, said latch being movable between a locked position wherein said latch engages said clapper when said clapper is in said first position and an unlocked position wherein said latch is spaced from said clapper when said clapper is in said second position;
- an actuator member mounted on said valve body and extending into said passage such that said actuator member engages said latch, said actuator member being movable between a set position wherein said latch is maintained in said locked position and an activated position wherein said actuator member is moved to said unlocked position;
- force applicator means for applying a first force to said actuator member to move said actuator member from said activated position to said set position and to maintain said actuator member in said set position wherein said clapper and latch are in said first and locked positions, respectively, and for applying a second force to said actuator member to move said actuator member from said set position to said activated position and to maintain said actuator member in said activated position wherein said clapper and latch are in said second and unlocked positions, respectively; and
- operator means for controlling the position of said clapper with respect to said valve seat, said operator means either securely retaining said clapper in said first position or allowing said clapper to freely move between said first and second positions, whereby said clapper moves to said first position when fluid flows from said outlet toward said inlet, and said clapper moves toward said second position when fluid flows from said inlet to said outlet, said operator means comprising linkage within said passage, said linkage being interconnected between said clapper and said valve body, said operator means further comprising actuator means slideably engaged with said linkage for moving said linkage with respect to said clapper and valve body to thereby move said clapper with respect to said valve seat.

4. The valve according to claim 3 wherein said linkage includes biasing means for initially biasing said clapper from said first position toward said second position.

5. The valve according to claim 3 wherein said linkage comprises a first linkage member having a first end and a second end and a second linkage member having a first end and a second end, said first end of said first linkage member being pivotally mounted to said valve body, said second end of said first linkage member being pivotally mounted to said first end of said second linkage member, said second end of said second linkage member being pivotally mounted to said clapper, said actuator means being slideably engaged with at least one of said first and second linkage members.

6. The valve according to claim 5 wherein said first linkage member has a predetermined length between said first and second ends thereof and said second linkage member has a predetermined length between said first and second ends thereof, said predetermined length of said first linkage member being greater than said predetermined length of said second linkage member.

7. The valve according to claim 5 wherein said second linkage member includes biasing means in engagement with said clapper when said clapper is in said first position for biasing said first end of said second linkage member toward said actuator means.

8. The valve according to claim 5 wherein said actuator means comprises a third linkage member having a first end pivotally mounted to said valve body, said actuator means further comprising drive means for moving said third linkage member into engagement with said first linkage member.

9. The valve according to claim 8 wherein said drive means comprises a rod having a first end positioned within said passage and a second end positioned externally of said valve body, said rod being reciprocally mounted on said valve body such that said first end of said rod reciprocates within said passage toward and away from said third linkage member, said third linkage member being in selective sliding engagement with said rod such that as said rod moves toward said third linkage member when said clapper is in said second position said rod engages said third linkage member, and moves said third linkage member toward said first and second linkage members into engagement with at least one of said first and second linkage members such that said first linkage member pivots about the first end thereof to thereby force the second end of said second linkage member toward said valve seat to secure said clapper in said first position.

10. The valve according to claim 9 wherein when said rod engages said third linkage member, said third linkage member moves toward said first and second linkage members and engages said second linkage member such that said second linkage member pivots about the first end thereof to thereby force the second end of said second linkage member toward said valve seat and then engages said first linkage member such that said first linkage member pivots about the first end thereof to thereby further force the second end of said second linkage member toward said valve seat to secure said clapper in the first position.

11. The valve according to claim 9 wherein said drive means further comprises a nut and screw mechanism operatively associated with said rod for moving said rod axially with respect to said valve body.

12. The valve according to claim 11 wherein said nut and screw mechanism is manually controlled.

13. The valve according to claim 11 wherein said drive means further comprises indicator means positioned externally of said valve body for indicating a position of said rod with respect to said valve body to thereby indicate whether said clapper is securely retained in said first position or is free to move between said first and second positions.

14. The valve according to claim 11 wherein said nut and screw mechanism comprises:
- a threaded bore extending into said second end of said rod;
- means for rotatably fixing said rod with respect to said valve body; and
- a complementary first threaded shaft positioned within said threaded bore such that rotation of said shaft causes said rod to move reciprocally with respect to said valve body.

15. The valve according to claim 14 wherein said shaft is accessible externally of said valve body.

16. The valve according to claim 15 further including a second threaded shaft having a first end and a second end, said first end being coupled to said first threaded shaft such that said second threaded shaft rotates therewith, said second threaded shaft extending away from said valve body through a wall such that said valve is positioned on one side of said wall and said second end of said second threaded shaft is positioned on another side of said wall, said second threaded shaft including second indicator means positioned on the other side of said wall for indicating a position of said rod with respect to said valve body whereby rotation of said second end of said second threaded shaft causes said rod to move reciprocally with respect to said valve body.

17. A valve field convertible between a wet configuration wherein liquid is constantly located within said valve and a dry configuration wherein a gas is located within said valve, said valve comprising;
- a valve body including an inlet for being in fluid communication with a fluid source and an outlet for being in fluid communication with an outlet conduit;
- a passage within said valve body interconnecting said inlet and said outlet for allowing fluid to flow through said valve body between said inlet and said outlet;
- a valve seat positioned within said valve body in alignment with said passage for allowing fluid communication therethrough;
- a clapper positioned within said passage;
- hinge means interconnected between said valve body and said clapper for allowing said clapper to pivot between a first position wherein said clapper is sealingly engaged with said valve seat to prevent fluid from flowing between said inlet and outlet and a second position wherein said clapper is spaced from said valve seat to allow fluid to flow from said inlet to said outlet;
- operator means for controlling the position of said clapper with respect to said valve seat, said operator means securely retaining said clapper in said first position in a first mode of operation and allowing said clapper to freely move between said first and second positions in a second mode of operation, whereby when operating in said second mode said clapper moves to said first position when fluid flows through said passage from said outlet toward said inlet, and said clapper moves to said second position when fluid flows through said passage from said inlet toward said outlet, said operator means comprising linkage within said passage, said linkage being interconnected between said clapper and said valve body, said operator means further comprising actuator means slideably engaged with said linkage for moving and said linkage with respect to said clapper and valve body to thereby move said clapper with respect to said valve seat; and
- control means for governing the position of said clapper with respect to said valve seat when said operator means is in said second mode of operation, said control means having a set position wherein said clapper is maintained in said first position and an activated position wherein said clapper is free to move between said first and second positions whereby the valve is field convertible between said wet and dry configurations.

18. The valve according to claim 17 wherein said linkage includes biasing means for initially biasing said clapper from said first position toward said second position.

19. The valve according to claim 17 wherein said linkage comprises a first linkage member having a first end and a second end and a second linkage member having a first end and a second end, said first end of said first linkage member being pivotally mounted to said valve body, said second end of said first linkage member being pivotally mounted to said first end of said second linkage member, said second end of said second linkage member being pivotally mounted to said clapper, said actuator means being slideably engaged with at least one of said first and second linkage members.

20. The valve according to claim 19 wherein said second linkage member includes biasing means in engagement with said clapper when said clapper is in said first position for biasing said first end of said second linkage member toward said actuator means.

21. The valve according to claim 19 wherein said actuator means comprises a third linkage member having a first end pivotally mounted to said valve body, said actuator means further comprising drive means for moving said third linkage member into engagement with said first linkage member.

22. A valve field convertible between a wet configuration wherein liquid is constantly located within said valve and a dry configuration wherein a gas is located within said valve, said valve comprising;
- a valve body including an inlet for being in fluid communication with a fluid source and an outlet for being in fluid communication with an outlet conduit;
- a passage within said valve body interconnecting said inlet and said outlet for allowing fluid to flow through said valve body between said inlet and said outlet;
- a valve seat positioned within said valve body in alignment with said passage for allowing fluid communication therethrough;
- a clapper positioned within said passage;
- hinge means interconnected between said valve body and said clapper for allowing said clapper to pivot between a first position wherein said clapper is sealingly engaged with said valve seat to prevent fluid from flowing between said inlet and outlet and a second position wherein said clapper is spaced from said valve seat to allow fluid to flow from said inlet to said outlet;

operator means for controlling the position of said clapper with respect to said valve seat, said operator means securely retaining said clapper in said first position in a first mode of operation and allowing said clapper to freely move between said first and second positions in a second mode of operation, whereby when operating in said second mode said clapper moves to said first position when fluid flows through said passage from said outlet toward said inlet, and said clapper moves to said second position when fluid flows through said passage from said inlet toward said outlet; and control means for governing the position of said clapper with respect to said valve seat when said operator means is in said second mode of operation, said control means having a set position wherein said clapper is maintained in said first position and an activated position wherein said clapper is free to move between said first and second positions whereby the valve is field convertible between said wet and dry configurations, said control means comprising:

a latch releasably positioned proximate said clapper, said latch being movable between a locked position wherein said latch engages said clapper when said clapper is in said first position and an unlocked position wherein said latch is spaced from said clapper when said clapper is in said second position;

an actuator member mounted on said valve body and extending into said passage such that said actuator member engages said latch, said actuator member being movable between a set position wherein said latch is maintained in said locked position and an activated position wherein said actuator member is movable to said unlocked position, said actuator member being a double acting piston mechanism having a piston secured to a piston rod, said piston and piston rod being reciprocally mounted within a cylinder, said piston rod being in engagement with said latch, said cylinder having a first inlet for allowing fluid to flow into said cylinder on a head side of said piston and a second inlet for allowing fluid to flow into said cylinder on a rod side of said piston; and force applicator means for applying a first force to said actuator member to move said actuator member from said activated position to said set position and to maintain said actuator member in said set position wherein said clapper and latch are in said first and locked positions, respectively, and for applying a second force to said actuator member to move said actuator member from said set position to said activated position and to maintain said actuator member in said activated position wherein said clapper and latch are in said second and unlocked positions, respectively.

23. The valve according to claim 22 wherein said force applicator means comprises a first valve having a supply inlet, a first outlet and a second outlet, said supply inlet being in fluid communication with a fluid supply, said first inlet being in fluid communication with said first outlet, said second inlet being in fluid communication with said second outlet, said first valve having a first position wherein said inlet and said first outlet are in fluid communication for allowing fluid to flow from said fluid supply into said cylinder on said head side of said piston and a second position wherein said supply inlet and said second outlet are in fluid communication for allowing fluid to flow from said fluid supply into said cylinder on said rod side of said piston.

24. The valve according to claim 23 wherein said drive means comprises a rod having a first end positioned within said passage and a second end positioned externally of said valve body, said rod being reciprocally mounted on said valve body such that said first end of said rod reciprocates within said passage toward and away from said third linkage member, said third linkage member being in selective sliding engagement with said rod such that as said rod moves toward said third linkage member when said clapper is in said second position said rod engages said third linkage member and moves said third linkage member toward said first and second linkage members into engagement with at least one of said first and second linkage members such that said first linkage member pivots about the first end thereof to thereby force the second end of said second linkage member toward said valve seat to secure said clapper in said first position.

25. The valve according to claim 24 wherein when said rod engages said third linkage member, said third linkage member moves toward said first and second linkage members and engages said second linkage member such that said second linkage member pivots about the first end thereof to thereby force the second end of said second linkage member toward said valve seat and then engages said first linkage member such that said first linkage member pivots about the first end thereof to thereby further force the second end of said second linkage member toward said valve seat to secure said clapper in the first position.

26. The valve according to claim 24 wherein said drive means further comprises a nut and screw mechanism operatively associated with said rod for moving said rod axially with respect to said valve body.

27. The valve according to claim 26 wherein said nut and screw mechanism is manually controlled.

28. The valve according to claim 26 wherein said drive means further comprises indicator means positioned externally of said valve body for indicating a position of said rod with respect to said valve body to thereby indicate whether said clapper is securely retained in said first position or is free to move between said first and second positions.

29. The valve according to claim 26 wherein said nut and screw mechanism comprises:
a threaded bore extending into said second end of said rod;
means for rotatably fixing said rod with respect to said valve body; and
a complementary first threaded shaft positioned within said threaded bore such that rotation of said shaft causes said rod to move reciprocally with respect to said valve body.

30. The valve according to claim 29 wherein said shaft is accessible externally of said valve body.

31. The valve according to claim 30 further including a second threaded shaft having a first end and a second end, said first end being coupled to said first threaded shaft such that said second threaded shaft rotates therewith, said second threaded shaft extending away from said valve body through a wall such that said valve is positioned on one side of said wall and said second end of said second threaded shaft is positioned on another side of said wall, said second threaded shaft including second indicator means positioned on the other side of said wall for indicating a position of said rod with respect to said valve body whereby rotation of said second end of said second threaded shaft causes said rod to move reciprocally with respect to said valve body.

* * * * *